(12) United States Patent
Reshef et al.

(10) Patent No.: US 11,240,324 B2
(45) Date of Patent: Feb. 1, 2022

(54) SYSTEM AND METHOD ANALYZING ACTUAL BEHAVIOR OF WEBSITE VISITORS

(71) Applicant: CONTENT SQUARE ISRAEL LTD., Ramat Gan (IL)

(72) Inventors: Ori Reshef, Tel Aviv (IL); Yuval Nachman, Kfar Saba (IL); Tuval Chomut, Tel Aviv (IL); Konstantin Kofman, Rehovot (IL)

(73) Assignee: CONTENT SQUARE ISRAEL LTD., Ramat Gan (IL)

( * ) Notice: Subject to any disclaimer, the term of this patent is extended or adjusted under 35 U.S.C. 154(b) by 0 days.

(21) Appl. No.: 15/788,323

(22) Filed: Oct. 19, 2017

(65) Prior Publication Data
US 2019/0124167 A1   Apr. 25, 2019

(51) Int. Cl.
*H04L 29/08* (2006.01)
*H04L 12/24* (2006.01)
(Continued)

(52) U.S. Cl.
CPC ........... *H04L 67/22* (2013.01); *G06F 16/285* (2019.01); *G06F 16/955* (2019.01); *G06F 16/9535* (2019.01); *G06F 16/986* (2019.01); *G06Q 30/0201* (2013.01); *H04L 41/14* (2013.01); *H04L 67/02* (2013.01); *G06F 3/0485* (2013.01); *G06F 3/0487* (2013.01); *G06F 3/04842* (2013.01)

(58) Field of Classification Search
CPC ......... H04L 67/22; H04L 41/14; H04L 67/02; G06F 16/285; G06F 16/955; G06F 16/986; G06F 3/04842; G06F 3/0485; G06F 3/0487; G06Q 30/0201; G06Q 30/00; G06Q 30/02; G06Q 10/10
See application file for complete search history.

(56) References Cited

U.S. PATENT DOCUMENTS

| | | |
|---|---|---|
| 7,941,525 B1 | 5/2011 | Yavilevich |
| 8,725,794 B2 | 5/2014 | Kandasamy et al. |

(Continued)

FOREIGN PATENT DOCUMENTS

| | | |
|---|---|---|
| EP | 3682647 | 7/2020 |
| WO | 2019079097 | 4/2019 |

OTHER PUBLICATIONS

International Search Report and Written Opinion of International Searching Authority for PCT/US2018/055414, ISA/RU, Moscow, Russia, dated Feb. 5, 2019.

(Continued)

*Primary Examiner* — Wing F Chan
*Assistant Examiner* — Billy H Ng
(74) *Attorney, Agent, or Firm* — Schwegman Lundberg & Woessner, P.A.

(57) ABSTRACT

A system and method for analyzing website visitor behavior. The method includes analyzing website visitor recordings associated with a website visit of each of a plurality of website visitors; determining a route taken within the website by each of the plurality of website visitors based on the website visitor recordings, wherein the route includes a chronological sequence of user interactions with website elements; and dividing the plurality of routes into clusters based on common path flows.

16 Claims, 4 Drawing Sheets

(51) Int. Cl.
    *G06Q 30/02*           (2012.01)
    *G06F 16/28*           (2019.01)
    *G06F 16/955*         (2019.01)
    *G06F 16/958*         (2019.01)
    *G06F 16/9535*       (2019.01)
    *G06F 3/0487*        (2013.01)
    *G06F 3/0485*        (2013.01)
    *G06F 3/0484*        (2013.01)

(56) References Cited

U.S. PATENT DOCUMENTS

| | | | |
|---|---|---|---|
| 9,691,096 B1* | 6/2017 | Dai | G06Q 30/0631 |
| 2002/0147772 A1 | 10/2002 | Glommen et al. | |
| 2003/0217159 A1* | 11/2003 | Schramm-Apple | G06F 19/324 |
| | | | 709/228 |
| 2006/0265495 A1* | 11/2006 | Butler | H04L 67/22 |
| | | | 709/224 |
| 2010/0131835 A1 | 5/2010 | Kumar et al. | |
| 2010/0281389 A1 | 11/2010 | Hutchinson | |
| 2012/0259871 A1* | 10/2012 | Holmes | G06Q 30/0242 |
| | | | 707/753 |
| 2013/0055268 A1* | 2/2013 | Amershi | G06F 11/34 |
| | | | 718/101 |
| 2014/0222503 A1* | 8/2014 | Vijayaraghavan | G06Q 30/0201 |
| | | | 705/7.29 |
| 2014/0331120 A1* | 11/2014 | Boyer | G06F 17/227 |
| | | | 715/234 |
| 2016/0050129 A1* | 2/2016 | Hoyne | H04L 43/08 |
| | | | 709/224 |
| 2017/0192882 A1 | 7/2017 | Bhagavathiammal et al. | |
| 2017/0244796 A1* | 8/2017 | Liu | G06F 3/0484 |
| 2018/0167317 A1* | 6/2018 | Hoyne | H04L 45/70 |
| 2018/0248902 A1* | 8/2018 | D Nil-Dumitrescu | G06N 3/02 |
| 2019/0007506 A1* | 1/2019 | Xu | H04L 67/22 |

OTHER PUBLICATIONS

Tikhonov, "Internet Structure Analysis With the Help of Common Routes", Large System Management, Issue 63, Sep. 30, 2016, pp. 38-47, 51, 62.
European Patent Office Search Report for Application No. 18869025.9, dated May 7, 2021.
"International Application Serial No. PCT US2018 055414, International Preliminary Report on Patentability dated Apr. 30, 20", 6 pgs.

* cited by examiner

SYSTEM AND METHOD ANALYZING ACTUAL BEHAVIOR OF WEBSITE VISITORS

TECHNICAL FIELD

The present disclosure relates generally to tracking visitors of website, and more specifically to a system and method of tracking and analyzing actual behavior of visitors to a website.

BACKGROUND

With the ubiquitous nature of the Internet, having a successful presence on the World Wide Web has become an indispensable tool for modern businesses and organizations. The commercial value of a website is cannot be understated, as it provides perhaps the most easily accessible portal through which current and potential clients can interact with a company, both through passive viewing, as well as active engagement, such as the purchasing of products and services and initiating contact with the company.

A website is a collection of web pages that are connected to each other using hypertext links. The links allow a user, or visitor, of the website to browse the various web pages of a website by selecting the links between the web pages. Users will often initially arrive at a homepage either from a search engine result or by directly entering the web address into a browser application, and make their way through the website until either the user performs a desired action, such as an online purchase, or the user leaves the website without performing such an action. Performing a desired action is referred to as a conversion, and the goal of many websites owners and operators is to maximize the number of conversions from the users of their website.

In order to increase conversion rates, website owners often edit, modify, or change variables related to their websites in order to optimize a user's experience within the website. Such variables include the layout of each web page, chosen color palette, font choice, size and placement of text, images and videos, placement of appropriate offers or advertisements and the like. Additionally, the removal of unused or distracting features can enhance the website user experience and in turn increase the conversion rate.

Each of these adjustments are site and page specific, as no two websites employ the exact same design while serving the exact same user population. Accordingly, it is imperative for a website owner to make adjustments that are customized for their userbase to most efficiently maximize the conversion rate.

Programs for analyzing traffic from website visitors are known in the art. The programs typically monitor static data and generate reports for review. The data can include web server activity, such as the most popular page by number of visits, peak hours of website activity, most popular entry page, and so on. Alternatively, user data related to an interaction of the user with the web page may be collected, including mouse movement, scrolling of web page, resizing of browser windows, click events, hover events, keyboard use and the like. User data may further include the path or route a user takes during a visit to the website, including which pages are visited, in what order are they visited, a chronological list of items that a user has interacted with during a website visit, buttons hovered over and buttons clicked on, and the like.

However, these solutions merely offer a collection of statistics compiled from individual user visits. While an average of certain statistics, such as time spent on the website may be determined, averaging every user statistic can obscure vital information. For example, analyzing both a group of heavily active users of a website who spend extended periods of time on web pages and engage with multiple elements of the website together with a group of passive users who only interact with the website in a limited basis will frustrate the ability of a website owner to meaningfully understand the trends of the various groups, as the examples lying on either end of the activity spectrum may cancel each other out. The known solutions fail to provide a method of determining groups of similar user behaviors and providing useful information regarding users' activity within each group.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for analyzing actual behavior of website visitors. The method includes: analyzing website visitor recordings associated with a website visit of each of a plurality of website visitors; determining a route taken within the website by each of the plurality of website visitors based on the website visitor recordings, wherein the route includes a chronological sequence of user interactions with website elements; and dividing the plurality of routes into clusters based on common path flows.

Certain embodiments disclosed herein also include a non-transitory computer readable medium having stored thereon causing a processing circuitry to execute a process for analyzing actual behavior of website visitors, the process comprising: analyzing website visitor recordings associated with a website visit of each of a plurality of website visitors; determining a route taken within the website by each of the plurality of website visitors based on the website visitor recordings, wherein the route includes a chronological sequence of user interactions with website elements; and dividing the plurality of routes into clusters based on common path flows.

Certain embodiments disclosed herein also include a system for analyzing actual behavior of website visitors. The system comprises: a processing circuitry; and a memory, the memory containing instructions that, when executed by the processing circuitry, configure the system to: analyze website visitor recordings associated with a website visit of each of a plurality of website visitors; determine a route taken within the website by each of the plurality of website visitors based on the website visitor recordings, wherein the route includes a chronological sequence of user interactions with website elements; and divide the plurality of routes into clusters based on common path flows.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for analyzing website user behavior. By way of example, the disclosed embodiments allow an owner of a website to understand the actual behavior of visitors (e.g., clients) in the website, or certain sections therein. For example, using the disclosed embodiments, such a business owner can better understand and realized "What are the most common flows of events in my page?", "What are the most common flows for non-converted page views?", "How can conversion be improved in these flows?", "Which A/B tests do I need to conduct?", "Did I make the right assumptions when I designed the page?", and so on. To this end, the system and method disclosed herein attempt to determine a path that most visitors walk through the website by grouping pageviews with similar behaviors. As will be discussed herein, the grouping and hence understating of visitors' behavior can be performed with respect to one or more specific KPIs.

In an example embodiment, the method includes receiving metadata associated recordings of multiple user website visits, analyzing the elements interacted with during the visit and the chronological sequence of such interactions, determining a route taken by a user based on interactions with the elements, comparing similar routes and clustering those routes together, and sorting the clustered routes to allow a website owner or operator to efficiently and easily analyze popular and non-popular routes in order to make informed decisions regarding the layout and design of the website.

Figure 1:
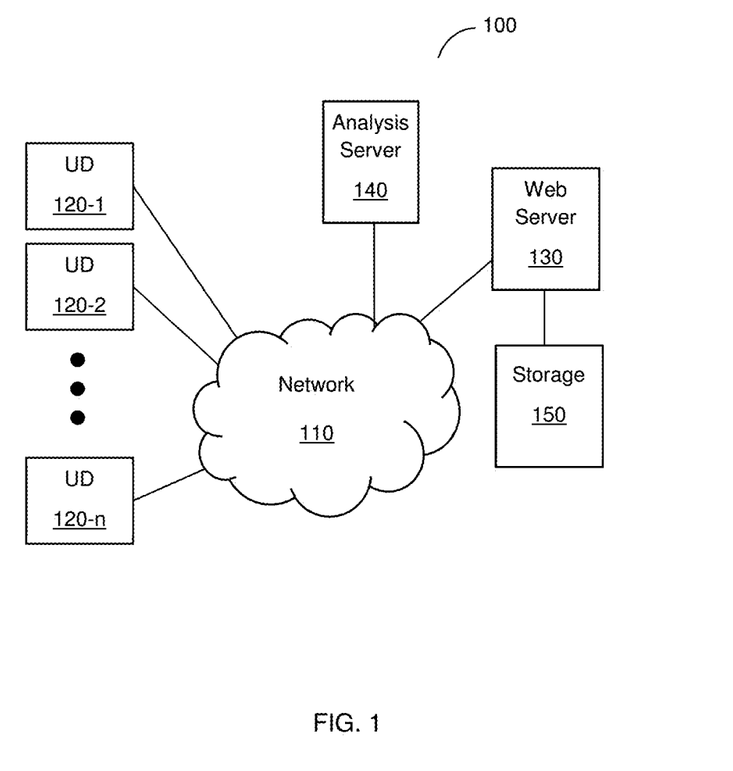
FIG. 1 is a diagram of a network system utilized to describe the various embodiments.

FIG. 1 is an example diagram of a network system 100 utilized to describe the various embodiments. The network system 100 includes one or more user devices, 120-1 through 120-n (hereinafter referred to in the singular as 120 for simplicity purposes), connected to a server 130 via a network 110. A storage 140 is operably connected to the web server 130. The user device 120 may include a smart phone, a personal computer, a laptop, a tablet, and similar devices configured to access websites over the network 110. The user device 120 can further include an application, such as a browser (not shown) adapted to display websites on the device over the network. The network 110 can be, but is not limited to, the Internet, a wide area network (WAN), a local area network (LAN), a metropolitan area network (MAN), and the like. The connections between the user device 120, the network 110 and the web server 130 may be wired or wireless, or any combination thereof.

The web server 130 is configured to host a website thereon, such that the website is accessible through the network 110. In an embodiment, the web server 130 is configured to receive a HTTP request from the user device 120 to display one or more web pages from a website hosted on the web server 130. In an embodiment, when a web page is sent to the user device 120, a tracking script included in the returned page. The tracking script, when executed by a browser of the user device 120, causes to record activities (interaction) of a device 120 with the displayed webpages. The tracking script can be realized as, for example, a JavaScript or any other type of an executable code.

The tracked and recorded user activities (also referred to as events) may include, for example: load, unload, scroll, mousemove, mousedown, mouseup, click, resize, keydown, keypress, keyup, paste, mouseleave, mouseenter, activate, deactivate, focus, blur, select, selectstart, submit, error, abort, and so on. Each event is associated with multiple properties or attributes. These properties can be transmitted together with the event. For example: mouse events are recorded with x, y coordinates of the cursor and the state of the mouse buttons; keyboard events are transmitted with the key that was pressed; scroll events are transmitted with the position of the scroll bars; resize events are transmitted with the new window size; click events are transmitted with the type and URL of the object or link that was clicked on. The collected events will be referred for each pageview is grouped into a recording. Each recording maybe includes metadata indicating, for example, pageview ID, duration of the recording, date of the recording, and so.

The metadata items associated with the user device 120, and the actions taken by a user using the user device 120 when engaging with the website, is collected and sent over the network 110 to an analysis server 140. In an embodiment, the analysis server 140 is located within the web server 130, while in a further embodiment, the analysis server 140 is separate from the web server 130 and connected to the network 110 independently.

The analysis server 140 is configured to collect the metadata from a plurality of user visits on the website from user devices 120-1 through 120-n. The metadata may include, but is not limited to, web pages visited within the website, time spent on each web page, and on the website as a whole, elements engaged with during the visit, cursor movements, and numbers of clicks, hovers, scrolls and the like. The analysis server 140 is configured to evaluate the metadata from a plurality of user devices 120 and determine a path or route taken among the various user visits of the website. Similar paths are then grouped together in clusters, and sorted according to the number of users classified under each path.

The analysis server 140 includes processing circuitry (not shown) configured to analyze the data and cluster the paths as described herein. The processing circuity may include general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that can perform calculations or other manipulations of information. In an embodiment, the collected user metadata is first collected by the web server 130 and then transferred to the analysis server 140, either directly or over the network 110. In a further embodiment, the user metadata is sent directly to the analysis server 140.

In an embodiment, the metadata and the detected paths are stored using a data serialization framework, such as Apache® Avro™. Data serialization allows data to be exchanged between various formats and programming languages. This ensures that the raw metadata and data captured from the user devices and the web server 130 can be processed by different systems. Additionally, data serialization translates input data into a format that can be more easily transmitted over a network 110 and stored in a storage media. The processed data may be stored on the storage 150, which may be connected to the web server 130, to the analysis server 140, or directly to the network 110, e.g., residing in a separate cloud computing platform, a datacenter, and the like.

Once the analysis server 140 has processed the user data, the resulting clusters and sorted list thereof may be sent to the webserver 130, stored in the storage 150, or sent to a website operator device (not shown) for analysis. The processing of user data can be at least one of: a planned event configured to run on a predetermined schedule, configured to run based on website traffic load, run manually on demand, or any combination thereof.

Figure 2:
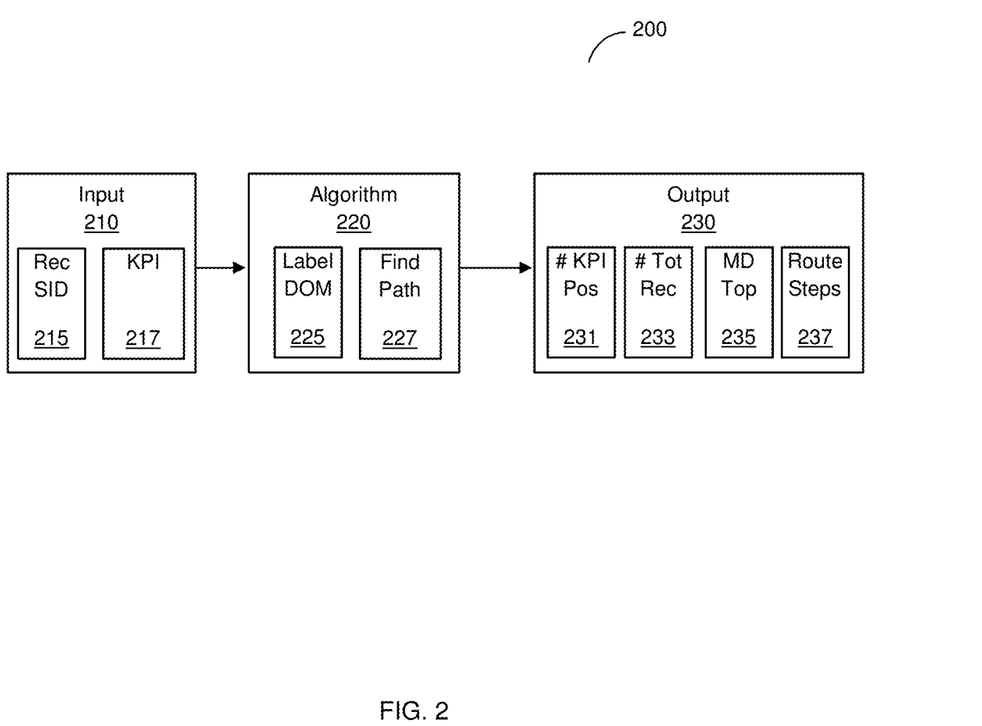
FIG. 2 is a block diagram of the method for tracking website behavior according to an embodiment.

FIG. 2 is a schematic diagram illustrating the process of tracking website behavior according to an embodiment. The method may be performed by the analysis server 140 of FIG. 1. Visits conducted by website users are recorded to track the sequence of events and interactions a user has with a website or webpage within a website. The recordings including the metadata items are analyzed by, e.g., the analysis server 140 as the input 210. The input 210 includes the recordings recorded for visitors engaging with website to be analyzed. In another embodiment, the input may include, for each recording, a flag indicating if the recording is key performance indicator (KPI) positive, KPI negative, or KPI neutral. The KPI status 217 indicates if the recording includes a key performance indicator such as, positive conversion rate, clicks on a call-to-action button (e.g., apply now, sign up, download page), and so on. The KPIs may be defined by the user. In some configuration, the input may further include, for each recording, a flag indicating if the recording should be ignored.

Next, a path identifier process 220 is performed. The process 220 is configured to analyze the metadata items and identify common paths taken by users of a website during a website visit. Websites are comprised of various elements that make up each web page. Each element of the website within a route is labelled 225.

In an embodiment, the elements that are labelled include document object model (DOM) elements which makeup the contents of a webpage. Such elements include the heading, title, or body and other various parts of a webpage. It should be noted that there may be DOM elements that are not identical, but can be deemed equivalent for purposes of the algorithm 220. For example, if two versions of the website are accessed by two different users, where the DOM elements differ in their paths, but represent the same aspect of a webpage, the elements may be deemed equivalent and labelled as such, and thus two otherwise identical routes, each containing the slightly different DOM elements, are grouped together.

When routes are determined to include sufficient common paths 227, they are grouped together in as a single cluster. As the path identifier process 220 analyzes a plurality of paths taken by the users visiting the website, each route that satisfies a specific KPI is added to an associated cluster. After a predetermined amount of user paths have been analyzed, it is determined which cluster comprises the most user path recordings. Namely, the process 220 determines what is the most common path taken by visitors to a website, what is the second most common path, and so on. This provides a website owner with valuable information regarding not just the average user statistics, but how each distinct group of visitors interact with the website.

Finally, the path identifier process 220 generates an including various pieces of information regarding the recordings. The information includes the number of KPI positive recordings within a single path 231, the number of total recording that satisfy the route 233, a set of metadata items for the top X examples of recordings within a single route 235, where X is a configurable number that may be adjusted according to the desired preferences of the website operator, and the sequence of steps taken during the recorded route 237. The metadata items include at least one of: a secure ID tag, a visitor ID tag, a project ID tag, the duration of the recording, and the position of each of the elements along the recorded route. The sequence of steps 237 include which elements within a website have been interacted with by a user, where a label is assign to each element, and where the interaction may include elements that have been clicked on or hovered over by a user.

Figure 3:
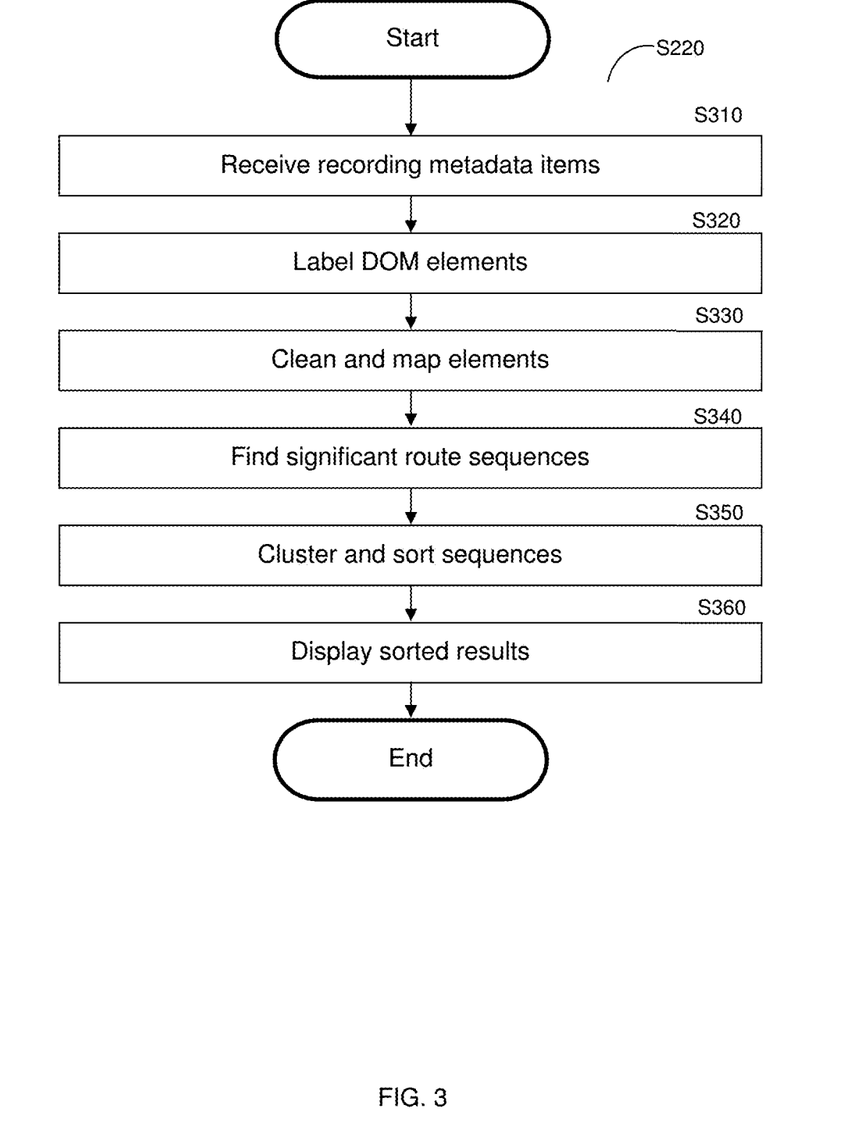
FIG. 3 is a flowchart of the algorithm to cluster similar paths of website visitors together according to an embodiment.

FIG. 3 shows an example flowchart of a method 300 for clustering similar paths of website visitors according to an embodiment.

At S310, the inputs of the path identification are received. The inputs may include the recordings recorded for visitors engaging with website to be analyzed, a flag indicating if the recording is KPI positive, negative, or neutral, and a flag indicating if a recording in the received recording should ignored. Typically, a recording would be ignored when it is too old, i.e., its recording date past a predefined expiration date. Each recording is identified by at least a pageview ID.

A set of user inputs can be analyzed according to the KPI flag. For example, a set of similar recordings can be subdivided into recordings containing a KPI positive flag. Alternatively, all received recordings can be analyzed regardless of KPI flag status. This allows for fine tuning and adjustment of analysis in order to highlight or minimize the importance of a KPI.

At S320, each received recording is analyzed by breaking down the elements contained within the recording and labelling each element. In an embodiment, the elements include DOM elements that make up the contents of a web page, such as <DIV>, <HTML>, <BODY> and other markers indicating the type of element and how it is to be used and displayed within a web page.

At S330, the elements are mapped and cleaned. In an embodiment, mapping the elements may include assigning characteristics for each element according to the data acquired from the recordings. Such characteristics include the number of clicks on the element, the total hover time over the element, and label assigned to the element.

In an embodiment, each element present within a recording is initially analyzed. Any element that has not been interacted with at all, or in a significant way, during the recording is removed, leaving only the elements that the user has interacted with in a significant form. Determining if an interaction has been significant can be based on, among other factors, the time spend engaging with the element. For example, if a user has only hovered over an element for less than 500 milliseconds, than may be deemed an insignificant interaction. Additionally, some elements may be combined for efficiency. If two elements, such as a parent and a child element, share sufficient data above a threshold, which may be predefined, such elements can be combined into a single element and labelled as such.

Next, the elements are cleaned. In embodiment, cleaning the elements include removing elements that a user has only had limited interaction with over the period of the recording. This may include, but is not limited to, elements having a total click count equaling less than a predefined threshold, such as 5% of all recording clicks, a total hover time equaling less than a predefined threshold, and elements receiving the least number of clicks or hover time when compared to the rest of the active elements, even if that amounts to more than the predefined threshold. These elements may be deemed outliers, and can be removed to improve the quality of the final data.

At S340, significant route sequences within the recordings are identified. In an example embodiment, S340 includes analyzing a chronological path taken by a user during a recorded visit and comparing multiple recordings to determine popular routes. For example, if a predetermined number or percentage of website visitors begin their interaction with the website by first landing on the home page, then hovering over a carousel element, followed by clicking a filter on a sidebar and finally by selecting a top resulting object, such a route can be deemed to be a significant route, and each recording containing this route can be labelled accordingly. The route includes user interactions such as, but not limited to, clicks on elements, hover time over elements deemed significant (i.e., not a simply pass over the element, but a pause for at least a predetermined period of time), scroll behavior, movements of a cursor over the web page, highlighting of text, selection of filter categories, and the like. In an embodiment, routes can be deemed equivalent if they are substantially similar, even if certain characteristics of the elements differ. For example, if two elements are placed in an identical position within a web page, and cause the display of an identical image, but are labelled differently, they may be deemed equivalent, and a route that is identical other than the difference in labelling of that element may be established as identical routes.

In an embodiment, the identification of the routes involves the following steps: obtain recorded metadata items from a user visit in a structured format, deserialize the structured data for more efficient processing, for example by using a language-neutral data serialization system, such as Apache® Avro™, remove unnecessary or very large elements, and store the results. These results are compared to other recordings, and similar routes producing the same results can be labelled identically.

Next, at S350, all recordings that have been determined to contain the same or equivalent routes, and thus contain the same label, are clustered together. Each of the clustered groups represent a route taken by multiple users and can be represented by that route. For example, a route can be identified by the chronological order in which the first 5 elements of a recording are interacted with by a user. After each of the recordings have been analyzed and clustered, the clusters are sorted by size, namely by the number of routes that match each cluster. The cluster containing the most routes taken by users is deemed to be the most popular route, the cluster containing the second most routes by users is deemed to be the second most popular routes, and so on.

The number of recordings that is used to determine if a cluster is sufficiently sized can be adjusted according to a website's needs and goal. The algorithm can be adjusted to require a certain percentage of traffic, or a certain number of qualifying routes, in order to be deemed significant. Thus, while first website that averages 10,000 user visits per month may deem a cluster comprising 4,000 visits highly significant, a second website averaging 10 million user visits per month may disregard a similarly sized cluster.

In an embodiment, a recording can be cut off according to a predetermined event. For example, once a user has completing an order on a commercial website, or placed an item in a cart, or initiated a chat session with a support representative, the algorithm can be configured to end the recording. Thus, once a conversion has taken place, any subsequently collected data can be deemed unnecessary. Trimming out unnecessary data allows for more efficient analyses, as systems such as the analysis server 140 of FIG. 1 will have to process less data to produce result with the same value of information.

In optional S360, the results of the sorted clusters are caused to be displayed, such as on an online dashboard. This allows for an efficient way of reviewing the results of the method to identify both popular and problematic routes and adjust a website accordingly. For example, if one route indicates that users leave the website after a certain number of steps, such a route may be tweaked. Similarly, if a popular route requires steps that are deemed to be unnecessary or out of the way, the route can be streamlined and optimized to increase a potential for conversion even more.

It should be noted that the disclosed method can be used to perform A/B testing, namely to analyze website user data by comparing to similar but different version of a website to determine if one version leads to an increase in conversions in comparison to the other version. But a website operator must be wary of clustering routes together from different version. Thus, even if the elements within the website are similar and labeled accordingly, if the layout or other adjusted factors are sufficiently different, analyzing the two sets of data together may yield deceptively unhelpful results.

Figure 4:
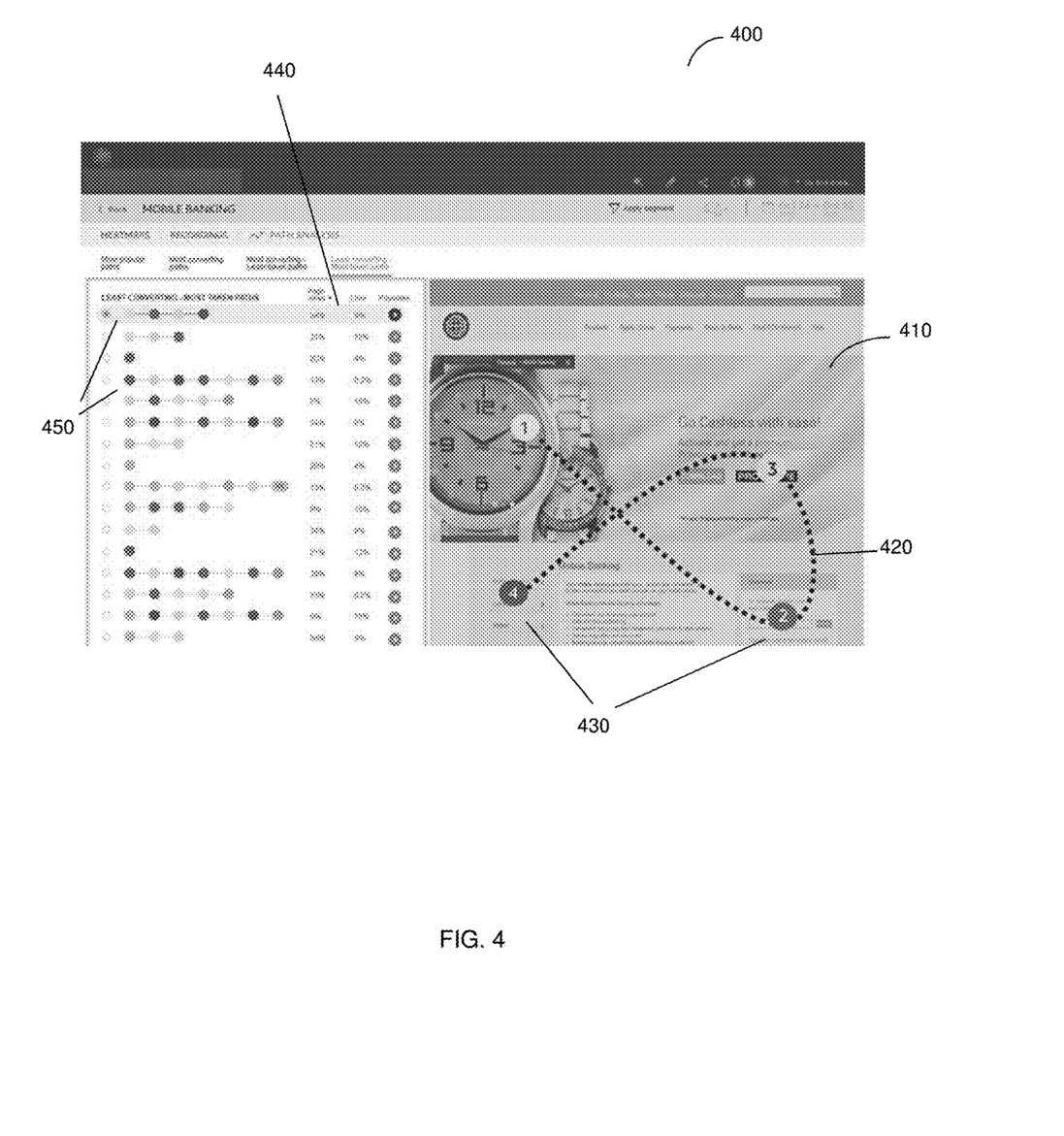
FIG. 4 shows an example screenshot of a dashboard displaying the results of the method according to an embodiment.

FIG. 4 shows a screenshot 400 of a dashboard displaying the results of the method according to an embodiment. The screenshot 400 may include an image 410 of the web page that is being analyzed, along with a path taken 420 within one route. Elements 430 within the route can be highlighted for efficient analysis. Additionally, a listing of the determined routes 450 may be displayed on the screen, allowing a website owner or operator to cycle through each of the clustered routes in order to view the elements that have been interacted with and the order in which they have been accessed by a website user. The dashboard may further include statistics 440, such as total number of routes contained within each cluster, percentage of total recording within each cluster, and so on. Additionally, the results may be sorted such that the most or least popular routes can be identified and analyzed.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method of analyzing website visitor behavior by an analysis server, comprising:
    analyzing, by the analysis server, electronically obtained website visitor recordings associated with a website visit of each of a plurality of website visitors;
    determining, by the analysis server, a route taken within the website by each of the plurality of website visitors based on the website visitor recordings, wherein the route includes a chronological sequence of user interactions with website elements, the website elements being elements within a webpage and wherein the website elements comprise document object model (DOM) elements;
    labeling each DOM element with a label;
    dividing, by the analysis server, the plurality of routes into clusters based on common path flows, wherein a common path flow represents a flow on which different users performed substantially the same action to arrive at the same location within the website and wherein the dividing further comprises comparing the labels of the DOM elements to each other to determine which of the labels of the DOM elements are equivalent labels and categorizing routes comprising the equivalent labels of the DOM elements into a single cluster; and
    sorting the clusters by number of routes.

2. The method of claim 1, further comprising:
    displaying the clusters sorted by number of routes that are in each cluster, wherein the number of routes in a cluster is directly proportional to a popularity of the routes in the cluster, the displaying thus revealing the relative popularity of routes contained within the clusters.

3. The method of claim 1, wherein the user interactions comprise at least one click and at least any one of: a hover over an element, a scroll event, and a mouse movement.

4. The method of claim 1, wherein the website visitor recordings are metadata associated with each user website visit, the metadata having been collected by a tracking script sent to each website visitor in response to a request to access a web page.

5. The method of claim 1, wherein dividing the plurality of routes into clusters further comprises:
    calculating at least one of: number of key performance indicators within each route, number of steps taken within each route, total time spent within each route.

6. The method of claim 1, further comprising:
    cleaning a route, wherein the cleaning includes at least one of: removing at least one element from the route after a predetermined event, removing from the route at least one element that is larger than a predetermined threshold, removing from the route at least one element having a click count below a predetermined count, and removing from the route at least one element having a hover lasting for less than a predetermined time period.

7. The method of claim 1, further comprising:
    applying data serializing to metadata associated with the recordings of the website visitor recordings.

8. The method of claim 1, further comprising cycling through at least two of the clusters so as to enable a user to view website elements that have been interacted with, and an order in which they have been accessed by, at least one website visitor.

9. A non-transitory computer readable medium having stored thereon instructions for causing processing circuitry to perform a process, the process comprising:
    analyzing, by the analysis server, electronically obtained website visitor recordings associated with a website visit of each of a plurality of website visitors;
    determining, by the analysis server, a route taken within the website by each of the plurality of website visitors based on the website visitor recordings, wherein the route includes a chronological sequence of user interactions with website elements, the website elements being elements within a webpage and wherein the website elements comprise document object model (DOM) elements;
    labeling each DOM element with a label;
    dividing, by the analysis server, the plurality of routes into clusters based on common path flows, wherein a common path flow represents a flow on which different users performed substantially the same action to arrive at the same location within the website and wherein the dividing further comprises comparing the labels of the DOM elements to each other to determine which of the labels of the DOM elements are equivalent labels and categorizing routes comprising the equivalent labels of the DOM elements into a single cluster; and
    sorting the clusters by number of routes.

10. A system for causing a processing circuitry to perform a process, comprising:
    a processing circuitry; and
    a memory, the memory containing instructions that, when executed by the processing circuitry, configure the system to:
    analyze website visitor recordings associated with a website visit of each of a plurality of website visitors;

determine a route taken within the website by each of the plurality of website visitors based on the website visitor recordings, wherein the route includes a chronological sequence of user interactions with website elements, the website elements being elements within a webpage and wherein the website elements comprise document object model (DOM) elements;

label each DOM element with a label;

divide the plurality of routes into clusters based on common path flows, wherein a common path flow represents a flow on which different users performed substantially the same action to arrive at the same location within the website and wherein divide the plurality of routes paths into clusters further comprises compare the labels of the DOM elements to each other to determine which of the labels of the DOM elements are equivalent labels and categorizing routes comprising the equivalent labels of the DOM elements into a single cluster; and sort the clusters by number of routes.

11. The system of claim 10, wherein the system is further configured to:

display the clusters sorted by number of routes that are in each cluster, wherein the number of routes in a cluster is directly proportional to a popularity of the routes in the cluster, the displaying thus revealing the relative popularity of routes contained within the clusters.

12. The system of claim 10, wherein the user interactions comprise at least one click and at least any one of: a hover over an element, a scroll event, and a mouse movement.

13. The system of claim 10, wherein the website visitor recordings are metadata associated with each user website visit, the metadata having been collected by a tracking script sent to each website visitor in response to a request to access a web page.

14. The system of claim 10, wherein divide the plurality of routes into clusters further comprises:

calculate at least one of: number of key performance indicators within each route, number of steps taken within each route, total time spent within each route.

15. The system of claim 10, wherein the system is further configured to:

clean a route, wherein the cleaning includes at least one of: removing at least one element from the route after a predetermined event, removing from the route at least one element that is larger than a predetermined threshold, removing from the route at least one element having a click count below a predetermined count, and removing from the route at least one element having a hover lasting for less than a predetermined time period.

16. The system of claim 10, wherein the system is further configured to:

apply data serializing to metadata associated with the recordings of the website visitor recordings.

* * * * *